(12) United States Patent
Monti

(10) Patent No.: US 11,446,812 B2
(45) Date of Patent: Sep. 20, 2022

(54) CABLE-DRIVEN ROBOT

(71) Applicant: MARCHESINI GROUP S.p.A., Pianoro (IT)

(72) Inventor: Giuseppe Monti, Pianoro (IT)

(73) Assignee: MARCHESINI GROUP S.P.A., Pianoro (IT)

( * ) Notice: Subject to any disclaimer, the term of this patent is extended or adjusted under 35 U.S.C. 154(b) by 206 days.

(21) Appl. No.: 16/771,559

(22) PCT Filed: Dec. 19, 2018

(86) PCT No.: PCT/IB2018/060347
§ 371 (c)(1),
(2) Date: Jun. 10, 2020

(87) PCT Pub. No.: WO2019/123318
PCT Pub. Date: Jun. 27, 2019

(65) Prior Publication Data
US 2020/0298395 A1    Sep. 24, 2020

(30) Foreign Application Priority Data

Dec. 22, 2017   (IT) .................. 102017000148720

(51) Int. Cl.
*B25J 9/00*   (2006.01)
*B25J 9/10*   (2006.01)

(52) U.S. Cl.
CPC ........... *B25J 9/0078* (2013.01); *B25J 9/104* (2013.01)

(58) Field of Classification Search
CPC ........ B25J 9/0075; B25J 9/0078; B25J 9/104

USPC .......................... 74/490.04; 901/21
See application file for complete search history.

(56) References Cited

U.S. PATENT DOCUMENTS

| | | | | |
|---|---|---|---|---|
| 4,710,819 A * | 12/1987 | Brown | ................... | F16M 13/00 348/157 |
| 5,313,854 A * | 5/1994 | Akeel | ................... | B25J 9/0078 901/43 |
| 5,585,707 A * | 12/1996 | Thompson | .............. | B25J 9/0078 405/188 |
| 5,716,352 A * | 2/1998 | Viola | ......................... | B25J 3/00 606/1 |
| 6,343,702 B1 * | 2/2002 | Masumoto | .............. | B66C 11/20 212/274 |
| 6,840,127 B2 * | 1/2005 | Moran | ..................... | G09B 9/46 414/735 |

(Continued)

FOREIGN PATENT DOCUMENTS

| FR | 2910833 A1 | 7/2008 |
|---|---|---|
| JP | H1011143 A | 1/1998 |

*Primary Examiner* — Joseph Brown
(74) *Attorney, Agent, or Firm* — R. Neil Sudol; Henry D. Coleman

(57) ABSTRACT

A cable-driven robot has a base, a platform movable with respect to the base, a plurality of motors mounted on the base, and a plurality of movement cables of the platform each fixed at a first end at a respective fixing point to the platform and at a second end thereof to a respective motor. The robot further includes a shaft rotatably mounted on the platform, a supplementary movement cable, and a supplementary activating motor mounted at a respective position on the base. The supplementary movement cable is fixed, at a first end, to the supplementary activating motor and is wound with a portion of its length on the shaft.

5 Claims, 3 Drawing Sheets

(56) References Cited

U.S. PATENT DOCUMENTS

| | | | | |
|---|---|---|---|---|
| 7,088,071 B2* | 8/2006 | Rodnunsky | F16M 11/048 | 318/649 |
| 7,267,240 B2* | 9/2007 | Maurer | B66C 13/063 | 212/270 |
| 9,308,652 B2* | 4/2016 | Pehlivan | B25J 18/025 | |
| 2004/0146388 A1* | 7/2004 | Khajepour | B25J 17/0266 | 414/680 |
| 2005/0024005 A1* | 2/2005 | Rodnunsky | B25J 9/0078 | 318/649 |
| 2009/0066100 A1* | 3/2009 | Bosscher | E04G 21/0418 | 901/30 |
| 2012/0043162 A1* | 2/2012 | Kim | B25J 17/0266 | 182/142 |
| 2013/0206956 A1* | 8/2013 | Kim | B25J 9/0078 | 901/1 |
| 2013/0253751 A1* | 9/2013 | Choi | G05D 1/0268 | 701/23 |
| 2013/0292543 A1* | 11/2013 | Kim | B66C 21/04 | 901/1 |
| 2013/0345876 A1* | 12/2013 | Rudakevych | B25J 9/104 | 700/259 |
| 2014/0290417 A1* | 10/2014 | Lukka | B25J 9/0078 | 74/490.04 |
| 2014/0312808 A1* | 10/2014 | Szarzynski | B25J 9/0078 | 318/6 |
| 2014/0331808 A1* | 11/2014 | Reid | B25J 9/0075 | 74/490.04 |
| 2015/0217975 A1* | 8/2015 | Khajepour | B66C 21/00 | 254/292 |
| 2016/0001443 A1* | 1/2016 | Davis | A63G 31/16 | 74/490.08 |
| 2018/0009103 A1* | 1/2018 | Yang | B25J 9/0078 | |
| 2018/0009115 A1* | 1/2018 | Ko | B25J 17/0266 | |
| 2018/0231100 A1* | 8/2018 | Khajepour | G05B 19/402 | |
| 2019/0152051 A1* | 5/2019 | Bramberger | E04G 21/0418 | |
| 2019/0187069 A1* | 6/2019 | Tolás | B66C 21/00 | |

* cited by examiner

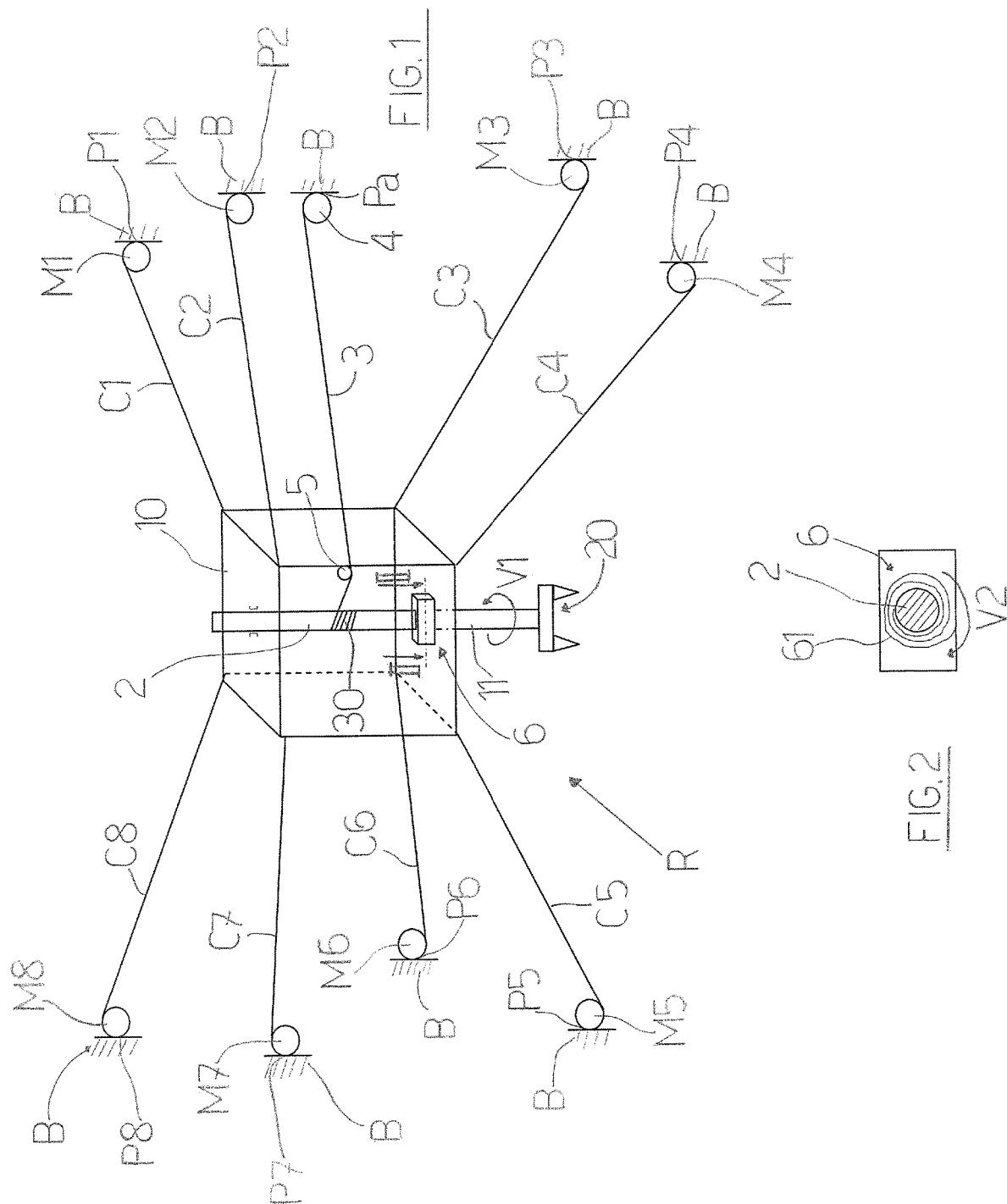

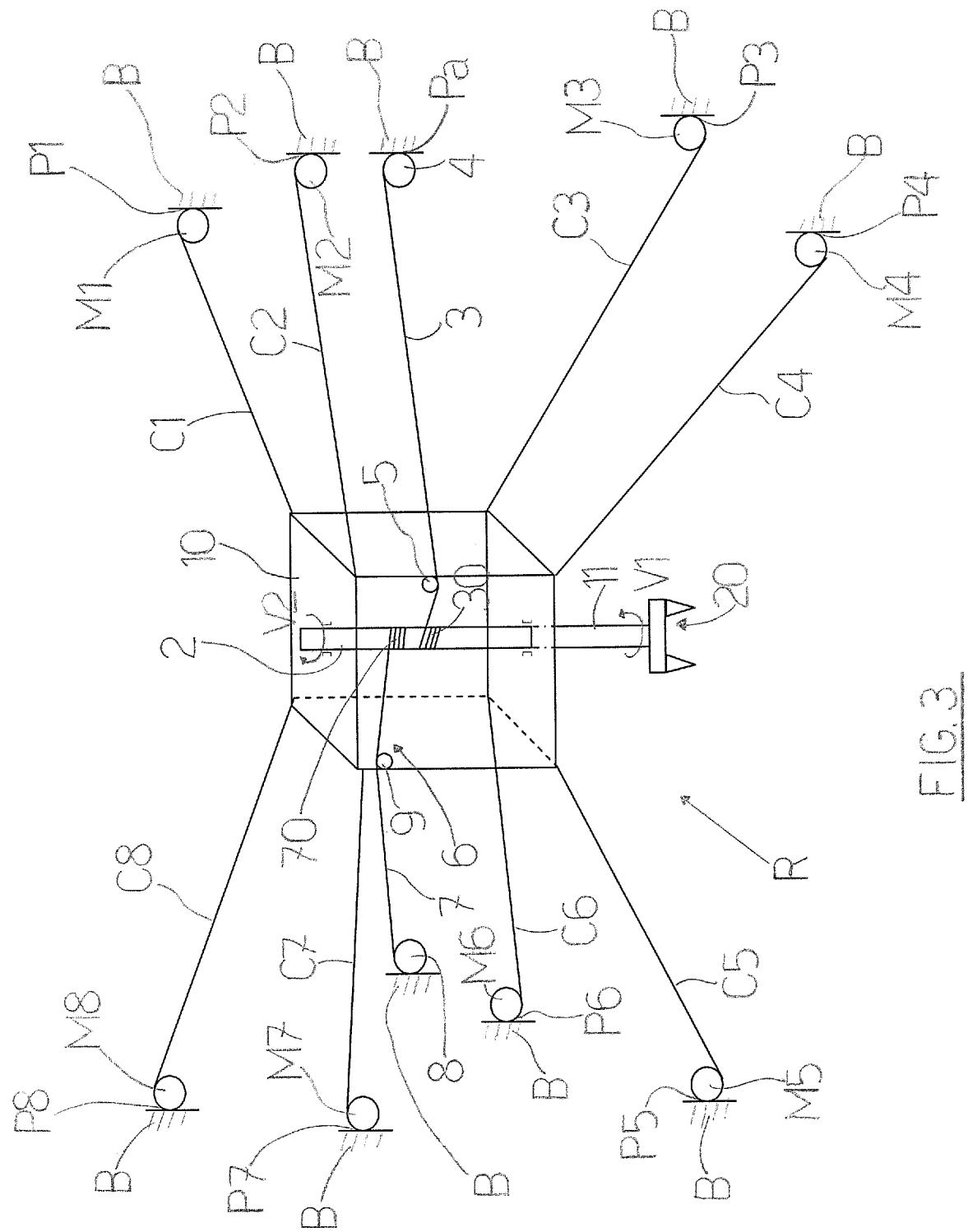

CABLE-DRIVEN ROBOT

FIELD OF THE INVENTION

The present invention relates to the technical sector concerning parallel robots, in particular cable-driven robots.

DESCRIPTION OF THE PRIOR ART

Cable-driven robots are parallel robots in which the movement arms are constituted by cables rather than by rigid or hinged connections.

Cable-driven robots comprise a base structure, or a fixed frame, a platform, or another equivalent element, which must be moved with respect to the base structure in a three-dimensional space, a series of motors predisposed in determined positions on the base structure, and a series of movement cables which, at a first end thereof, are fixed to corresponding points of the platform and, at the second end thereof, are connected to a respective motor.

The motors, for example constituted by winches or hoists or other like activations, are predisposed and activatable to wind or unwind the cables, i.e. to pull (shorten) or release (allow lengthening) the cables.

In this way, the length of each single cable, i.e. the length (extension) thereof between the fixing point and the platform and the point in which the relative motor is fixed to the base structure, can be varied, either increased or reduced.

By appropriately activating the various motors, and thus lengthening or shortening the various cables, it is possible to move and displace the platform with respect to the base structure.

Thus, in cable-driven robots, by adjusting and varying the length of the various cables it is possible to control and vary the position of the platform in a three-dimensional working space.

The number of cables used influences the possibilities of movement in the three spatial directions (three coordinates); the greater the number of cables, the greater the possibility of moving and displacing the platform in the three-dimensional space.

At present there exist cable-driven robots that use up to 8 cables connected at a same number of points of the platform.

Cable-driven robots comprising 8 cables enable unproblematically moving and displacing the platform in the most varied trajectories within a three-dimensional workplace, and to position it in any position.

However, a limitation of cable-driven robots relates to the possibility of making the platform perform rotations about the axis thereof.

In fact, with cable-driven robots using 8 cables the possibility of acting on the motors, to lengthen or shorten the cables, enables limited angular rotations of the platform, at most about 40°-50°.

This circumstance undoubtedly constitutes a limit in all those applications in which it is necessary to handle an object, for example by use of pliers or a gripping hand borne by the platform, and to be able to rotate, in one direction or another, without any limitation, i.e. with the possibility of performing rotations up to 360° or beyond.

SUMMARY OF THE INVENTION

The aim of the present invention is therefore to provide a cable-driven robot able to obviate the above-mentioned drawbacks.

In particular, an aim of the present invention is to provide a cable-driven robot able to handle an object and freely set the object in rotation, and thus rotate the object with rotation angles as desired, even up to 360° and beyond.

The above aims are attained according to a cable-driven robot according to claim 1.

Other advantageous aspects of the cable-driven robot of the present invention are set out in the dependent claims.

BRIEF DESCRIPTION OF THE DRAWINGS

The characteristics of preferred, but not exclusive, embodiments of the cable-driven robot of the present invention will be described in the following with reference to the appended tables of drawings, in which:

FIG. 1 illustrates a schematic perspective view of a first embodiment of the cable-driven robot of the present invention;

FIG. 2 is a view along section plane II-II of FIG. 1;

FIG. 3 illustrates a schematic perspective view of a second preferred embodiment of the cable-driven robot of the present invention;

DESCRIPTION OF THE PREFERRED EMBODIMENTS

Figure 4:
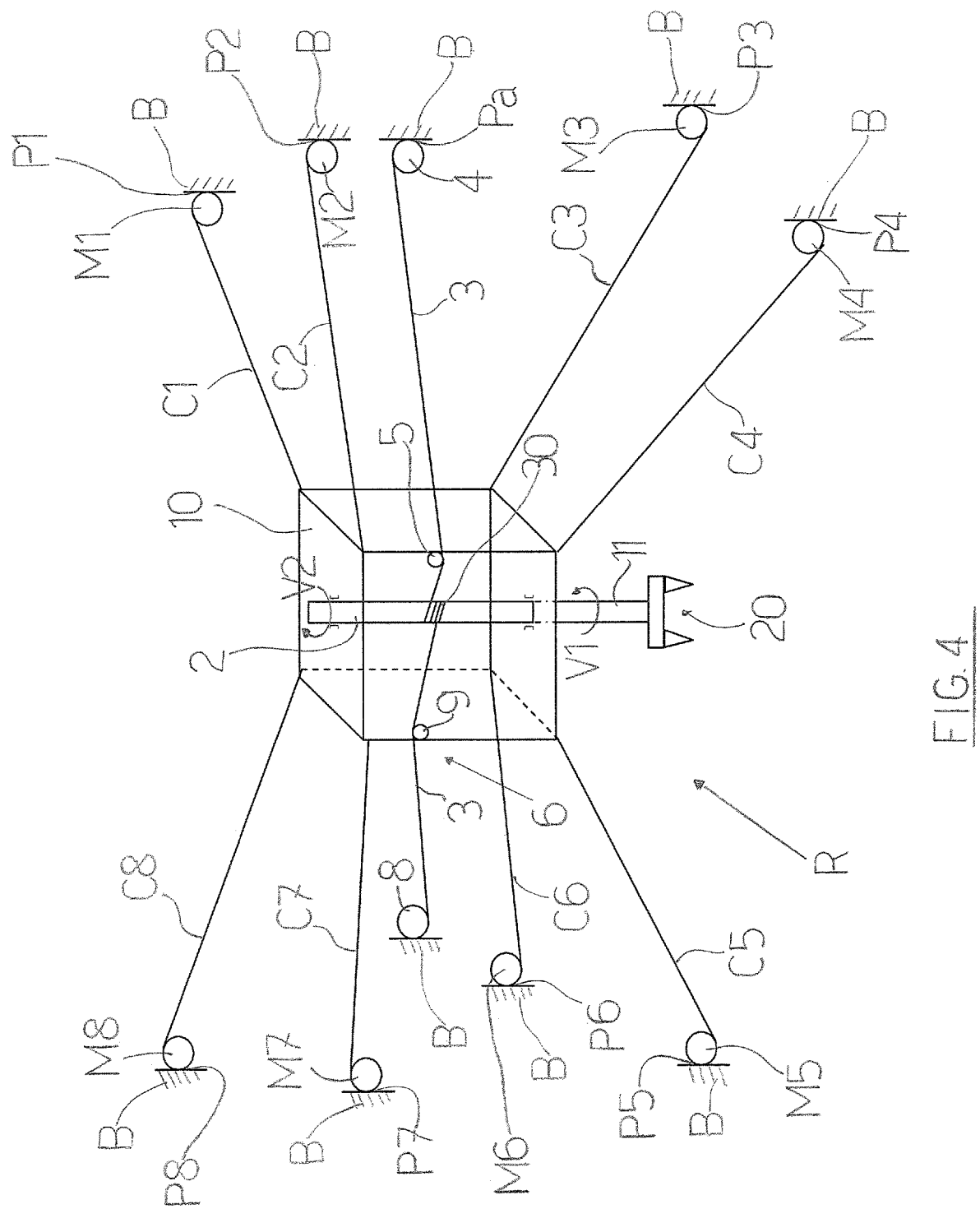
FIG. 4 illustrates, in a schematic perspective view, a third possible preferred embodiment of the cable-driven robot of the present invention.

With reference to the accompanying tables of drawings, reference letter (R) denotes the cable-driven robot of the present invention in both the preferred embodiments illustrated.

The cable-driven robot (R) comprises:

the base structure (B), for example constituted by a fixed or mobile frame with respect to a Cartesian reference system;

a platform (10) which must be moved with respect to the base structure (B) in a three-dimensional space;

a plurality of motor means (M1, M2, . . . , Mi, . . . Mn) which are predisposed and mounted at respective positions (P1, P2, . . . Pi, . . . Pn) on the base structure (B);

and a plurality of movement cables (C1, C2, . . . , Ci, . . . , Cn) of the platform (10).

Each of the movement cables (C1, C2, . . . , Ci, . . . , Cn) being fixed, at a first end thereof, to a relative fixing point to the platform (10) and, at a second end thereof, to a respective motor means of the plurality of motor means (M1, M2, . . . , Mi, . . . Mn).

Each of the motor means (M1, M2, . . . , Mi, . . . Mn) is in turn predisposed and activatable in such a way as to be able to wind and unwind the relative movement cable for the movement of the platform (10) with respect to the base structure (B).

In this way, by appropriately activating the various motor means (M1, M2, . . . , Mi, . . . Mn), to wind or unwind the relative movement cables (C1, C2, . . . , Ci, . . . , Cn), i.e. by shortening or lengthening the part of the movement cables (C1, C2, . . . , Ci, . . . , Cn) between the fixing points thereof to the platform (10) and the motor means (M1, M2, . . . , Mi, . . . Mn) themselves, the robot (R) is able to move the platform (10) with respect to the base structure (B) in a three-dimensional space, and position it in any position internally of the three-dimensional space.

For example, the cable-driven robot (R) of the invention can equally be predisposed so as to comprise a number of cables n variable from 3 cables up to 8 movement cables (C1, C2, C3, C4, C5, C6, C7, C8), and so as to comprise a corresponding number of motor means n variable from 3 motor means up to 8 motor means (M1, M2, M3, M4, M5, M6, M7, M8 (as illustrated in FIGS. 1 and 3).

The special characteristics of the cable-driven robot (R) provided by the present invention consist in the fact that it further comprises:

a shaft (2) mounted on the platform (10) with the possibility of being put in rotation with respect to the axis thereof (for example the shaft (2) can be mounted by means of relative bearings on the platform (10));

a supplementary movement cable (3);

a supplementary activating motor means (4) predisposed and mounted at a respective position (Pa) on the base structure (B).

In particular, the supplementary movement cable (3) is fixed, at a relative first end, to the supplementary activating motor means (4) and is wound with a portion (30) of the relative length on the shaft (2).

The supplementary activating motor means (4), in turn, is predisposed and activatable so as to be able to wind and unwind the supplementary movement cable (3) and so as to be able to apply, via the supplementary movement cable (3), an angular momentum on the shaft (2) and thus to set the shaft (2) in rotation with respect to the platform (10) according to a first rotation direction (V1).

In this way, independently of the movement of the platform (10) and the positioning thereof with respect to the base structure (B), the cable-driven robot (R) of the invention is able to set the shaft (2) in rotation with respect to the platform simply by activating the supplementary activating motor means (4) in order to apply, via the supplementary movement cable (3), an angular momentum on the shaft (2).

For example, the cable-driven robot (R) of the invention can be predisposed in such a way that the supplementary activating motor means (4) is activated, during the movement of the platform (10) with respect to the base structure (B) carried out by activation of the series of motor means (M1, M2, . . . , Mi, . . . Mn) for lengthening or shortening the movement cables (C1, C2, . . . , Ci, . . . Cn), so as to wind and/or unwind the supplementary movement cable (3) in such a way that no angular momentum is applied on the shaft (2).

In this way, the shaft (2) remains stationary with respect to the platform (10) during the movement of the platform (10).

The supplementary activating motor means (4), once the platform (10) has been brought to and halted in a given desired position with respect to the base structure (B), can then be activated so as to apply, via the supplementary movement cable (3), in particular by winding it, that is, by applying a traction on the supplementary movement cable (3) (by reducing the length of the portion (30) of the cable wound on the shaft (2)), an angular momentum on the shaft (2) that will then be activated in rotation with respect to the platform (10).

The entity of the maximum angular rotation which can be imparted to the shaft will depend on the overall length of the portion (30) of supplementary movement cable (3) that is wound on the shaft (2).

In a further possible variant, the supplementary activating motor means (4) can also be activated in order, during the movement of the platform (10) with respect to the base structure (B) carried out by activation of the series of motor means (M1, M2, . . . , Mi, . . . Mn) for lengthening or shortening the movement cables (C1, C2, . . . , Ci, . . . Cn), to wind or unwind the supplementary movement cable (3) from the shaft (2) so that an angular momentum is applied on the shaft (2), so that the shaft (2) can be set in rotation with respect to the platform (10) even during the movement thereof.

Further advantageous characteristics of the cable-driven robot proposed by the present invention are described in the following.

The cable-driven robot (R) can comprise a idler return member (5), for example an idle pulley, predisposed on the platform (10) so as to constitute a return for the supplementary movement cable (3) between the shaft (2) and the supplementary activating motor means (4).

The supplementary activating motor means (4) is preferably mounted on the base structure (B) and the idler return member (5) is predisposed and mounted on the platform (10) in such a way that the part of the supplementary movement cable (3) between the idler return member (5) and the supplementary activating motor means (4) is parallel to at least one of the movement cables (C1, C2, . . . , Ci, . . . , Cn) of the platform (10).

In this way, for each position assumed by the platform (10) with respect to the base structure (B) it will be easy to know the maximum entity of the rotation that can be imparted on the shaft (2): in fact, it will be a function of the difference between the overall length of the supplementary movement cable (3) and the overall length of the movement cable parallel thereto.

In a particularly preferred and advantageous aspect, the cable-driven robot (R) can comprise means (6) for setting the shaft (2) in rotation with respect to the platform (10) in a second rotation direction (V2) opposite the first rotation direction (V1).

In this way it will be possible to activate the shaft (2) in rotation about the axis thereof and with respect to the platform (10) in both possible rotation directions.

In a first possible embodiment, illustrated in FIGS. 1 and 2, the supplementary movement cable (3) is preferably wound by a portion (30) of the length thereof on the shaft (2) and is fixed, at a relative second end, on the shaft (2), the means (6) for setting the shaft (2) in rotation in a second rotation direction (V2) comprising a spiral torsion spring (61) which is predisposed coaxially to the shaft (2) and fixed, at a first end thereof, to the shaft (2) and at a second end thereof, to a fixed point on the platform (10).

In this way the torsion spring (61), when the shaft (2) is activated in rotation via the supplementary movement cable (3), is loaded and, by activating the supplementary activating motor means (4) so that the supplementary movement cable (3) can unwind from the supplementary activating motor means (4), the torsion spring (61) will recall the shaft (2) by rotating it in a second rotation direction (V2), opposite the first rotation direction (V1).

The entity of the recall rotation of the torsion spring (61) can be appropriately priorly calibrated, causing the shaft (2) to rotate so that the torsion spring (61) reaches the maximum compression thereof and thus, once the corresponding angular rotation value of the shaft (2) has been obtained, predisposing a zero-set of the scale at the halfway point of the angular rotation.

Alternatively in a second further possible embodiment, illustrated for example in FIG. 3, the supplementary movement cable (3) is preferably wound by a portion (30) of the length thereof on the shaft (2) and is fixed, at a relative second end, on the shaft (2), the means (6) for setting the shaft (2) in rotation in a second rotation direction (V2) comprising a second supplementary activating motor means (8) predisposed and, mounted at a respective position on the base structure (B) and a second supplementary movement cable (7), the second supplementary movement cable (7) being fixed, at a relative first end, at the supplementary activating motor means (2) and being wound with a portion (70) of the relative length on the shaft (2), and fixed, at a second end thereof, to the second supplementary activating motor means (8).

The second supplementary activating motor means (8) is predisposed and activatable so as to be able to apply on the shaft (2), via the second supplementary movement cable (7), an angular momentum in an opposite direction to the direction applicable by the supplementary activating motor means (4), via the supplementary movement cable (3).

In this second embodiment, the cable-driven robot (R) can also comprise a second idler return member (9) predisposed on the platform (10) in such a way as to constitute a return for the second supplementary movement cable means (7) between the shaft (2) and the second supplementary activating motor means (8).

In this case, in particular the second supplementary activating motor means (8) is mounted on the base structure (B) and the second idler return member (9) is predisposed and mounted on the platform (10) in such a way that the part of the second supplementary movement cable (7) between the second idler return member (9) and the second supplementary activating motor means (8) is parallel to at least one of the movement cables (C1, C2, . . . , Ci, . . . , Cn) of the platform (10).

In this way, as described in the foregoing for the supplementary movement cable, it will be easy to find out the maximum entity of the rotation in the second rotation direction that can be imparted on the shaft.

In a third further possible embodiment, illustrated for example in FIG. 4, the means (6) for setting the shaft (2) in rotation in a second rotation direction (V2) can comprise a second supplementary activating motor means (8) predisposed and mounted at a respective position on the base structure (B), the supplementary movement cable (3) having a total length that is such that it is wound with a portion (30) of the length thereof on the shaft (2) and is fixed, at a relative second end, to the second supplementary activating motor means (8).

The second supplementary activating motor means (8) is therefore activatable to apply on the shaft (2), using the supplementary movement cable (3), an angular momentum in an opposite direction to the direction applicable by the supplementary activating motor means (4).

In this third embodiment too, the cable-driven robot can comprise a idler second return member (9) predisposed on the platform (10) in such a way as to constitute a return for the supplementary movement cable (3) between the shaft (2) and the second supplementary activating motor means (8).

In particular, as for the second embodiment, the second supplementary activating motor means (8) is preferably mounted on the base structure (B) and the idler second return member (9) is predisposed and mounted on the platform (10) in such a way that the part of the supplementary movement cable (3) between the idler second return member (9) and the second supplementary activating motor means (8) is parallel to at least one of the movement cables (C1, C2, . . . , Ci, . . . , Cn) of the platform (10).

In a further preferred aspect, in combination with one or all the preceding characteristics, in both the first and the second preferred embodiments, the cable-driven robot (R) is such that the platform (10) has a frame having a parallelepiped shape having a quadrangular base (for example square or rectangular), and such that the movement cables (C1, C2, . . . , Ci, . . . , Cn) are fixed to vertices of the parallelepiped or to points of the edges of the parallelepiped.

Further and again in combination with one or all the preceding characteristics, in both the first and the second preferred embodiments, the cable-driven robot (R) is such that the shaft (2) is mounted on the platform (10) so as to have a relative end (11) projecting from the platform (10) and such that it comprises a gripping means (20) predisposed on the end (11) of the shaft (2) projecting from the platform in order to grip and/or release a relative object.

In this way, with the rotation of the shaft (2) with respect to the platform (10), the robot will be able to cause the object, retained by the gripping means, to perform desired angular rotations without limits on the entity of the rotation angle, and thus also up to rotations of 360° and beyond.

The invention claimed is:

1. A cable-driven robot comprising:
a base structure;
a platform;
a plurality of motor means which are arranged and mounted at respective positions on the base structure;
a plurality of movement cables of the platform, each of the movement cables being fixed, at a first end thereof, to a respective fixing point to the platform and, at a second end thereof, to a respective motor means of the plurality of motor means, wherein each of the motor means is arranged and activatable to wind and unwind a respective movement cable for moving the platform in a three dimensional space with respect to the base structure;
a shaft rotatably mounted on the platform for rotation with respect to an axis thereof;
a supplementary movement cable; and
a supplementary activating motor means arranged and mounted at a respective position on the base structure,
the supplementary movement cable having (i) a first end fixed to the supplementary activating motor means, (ii) a portion wound on the shaft, and (iii) a second end fixed to the shaft, the supplementary activating motor means being arranged and activatable to wind and unwind the supplementary movement cable and to apply, via the supplementary movement cable, an angular momentum on the shaft and thus to set the shaft in rotation with respect to the platform according to a first rotation direction,
further comprising means for setting the shaft in rotation with respect to the platform in a second rotation direction opposite the first rotation direction,
the means for setting the shaft in rotation in the second rotation direction comprising a spiral torsion spring arranged coaxially to the shaft and having a first end fixed to the shaft and at a second end fixed to a fixed point on the platform.

2. The cable-driven robot of claim 1, further comprising an idler return member arranged on the platform so as to constitute a return for the supplementary movement cable between the shaft and the supplementary activating motor means.

3. The cable-driven robot of claim 2, wherein the idler return member is arranged and mounted on the platform in such a way that a part of the supplementary movement cable between the idler return member and the supplementary activating motor means is parallel to at least one of the movement cables of the platform.

4. The cable-driven robot of claim 1, wherein the platform has a frame having a parallelepiped shape having a quadrangular base, and in that the movement cables are fixed to vertices of the parallelepiped shape or to points of the edges of the parallelepiped shape.

5. The cable-driven robot of claim 1, wherein the shaft is mounted on the platform so as to have an end projecting from the platform, further comprising a gripping means arranged on the end of the shaft projecting from the platform.

* * * * *